(12) United States Patent
Lee et al.

(10) Patent No.: US 8,111,969 B2
(45) Date of Patent: Feb. 7, 2012

(54) METHODS OF FABRICATING LIGHT GUIDE MEMBERS AND BACKLIGHT UNITS

(75) Inventors: Dong Ho Lee, Ulsan-si (KR); Won Ki Cho, Yangsan-si (KR); Min Ho Lee, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 122 days.

(21) Appl. No.: 12/662,252

(22) Filed: Apr. 7, 2010

(65) Prior Publication Data

US 2010/0193978 A1 Aug. 5, 2010

Related U.S. Application Data

(62) Division of application No. 11/727,052, filed on Mar. 23, 2007, now Pat. No. 7,697,813.

(30) Foreign Application Priority Data

Jul. 4, 2006 (KR) .......................... 10-2006-0062734

(51) Int. Cl.
*G02B 6/10* (2006.01)
(52) U.S. Cl. .......................... 385/146; 385/901; 264/1.24
(58) Field of Classification Search .......................... None
See application file for complete search history.

(56) References Cited

U.S. PATENT DOCUMENTS

| 6,746,129 B2 | 6/2004 | Ohkawa |
| 6,985,131 B2 | 1/2006 | Kawada et al. |
| 2003/0021099 A1 | 1/2003 | Suzuki et al. |
| 2004/0125588 A1 | 7/2004 | Ho |
| 2004/0130882 A1 | 7/2004 | Hara et al. |
| 2004/0130883 A1 | 7/2004 | Leu et al. |
| 2004/0207775 A1 | 10/2004 | Min et al. |
| 2004/0227262 A1* | 11/2004 | Kim .............................. 264/1.24 |
| 2004/0229171 A1* | 11/2004 | Chen ............................. 430/320 |
| 2005/0117370 A1 | 6/2005 | Kawashima et al. |
| 2006/0092669 A1 | 5/2006 | Chen |
| 2007/0127267 A1* | 6/2007 | Chen ............................. 362/626 |

FOREIGN PATENT DOCUMENTS

| CN | 1 396 483 A | 2/2003 |
| EP | 1 351 074 | 10/2003 |
| FR | 2 620 795 | 3/1989 |
| JP | 2002-107716 A | 4/2002 |
| JP | 2002-169034 A | 6/2002 |
| JP | 2004-037982 A | 2/2004 |
| KR | 10-2002-0013790 A | 2/2002 |
| KR | 10-2003-0060023 A | 7/2003 |
| KR | 10-2004-0090070 A | 10/2004 |
| KR | 10-2006-0028895 A | 4/2006 |
| KR | 10-2006-0093892 A | 8/2006 |
| WO | WO 2006/100744 A1 | 9/2006 |

* cited by examiner

*Primary Examiner* — Hemang Sanghavi
(74) *Attorney, Agent, or Firm* — Lee & Morse, P.C.

(57) ABSTRACT

A light guide member capable of guiding light received from at least a first light source and second light source, wherein the first light source is spaced a distance D3 from the second light source. The light guide member may include a first side including a plurality of first grooves extending along a first direction and a plurality of second grooves extending along the first direction, wherein the first grooves may have a first pitch and the second grooves have a second pitch, the first pitch being different from the second pitch.

13 Claims, 10 Drawing Sheets

METHODS OF FABRICATING LIGHT GUIDE MEMBERS AND BACKLIGHT UNITS

CROSS REFERENCE TO RELATED APPLICATION

This is a divisional application based on application Ser. No. 11/727,052 filed Mar. 23, 2007, now U.S. Pat. No. 7,697,813 the entire contents of which is hereby incorporated by reference.

BACKGROUND OF THE INVENTION

1. Field of the Invention

The invention relates to a light guide member and a backlight unit including a light guide member. More particularly, the invention relates to a light guide member for guiding light traveling therein and providing uniformly distributed light, and a backlight unit employing such a light guide member.

2. Description of the Related Art

A light guide member may be employed, e.g., by an illumination device of a display device, to receive light from a light source of the illumination device and guide the received light so as to provide light having a uniform luminance distribution to a display panel of the display device. For example, a flat panel display device, e.g., a liquid crystal display (LCD), may include an illumination device, e.g., a backlight unit (BLU), which may include a light guide member.

There is a demand for improved display devices in, e.g., the information and communication industries. More particularly, e.g., higher resolution, lighter, thinner, and/or less power consuming display devices are desired. One possible approach for developing such improved display devices is to provide thinner, lighter BLUs and/or improved light guide members capable of providing light having a more uniform luminance distribution.

For example, one type of flat panel display that is widely used today is thin film transistor-liquid crystal displays (TFT-LCDs). Such TFT-LCDs may include a LCD panel in which liquid crystal is provided between two substrates, a BLU as an illumination device positioned in a lower portion of the LCD panel, and a LCD drive IC (LDI) for driving the LCD panel. The BLU unit may include, e.g., a light source, a light guide member, and an optical sheet including a diffusion sheet and a prism sheet.

The light source may supply non-uniformly distributed linear light to the light guide member. Generally, the light guide member is to modify the non-uniformly distributed linear light and output planar light having a uniform optical distribution. However, conventional light guide members fall short of outputting uniformly distributed linear light. For example, portions of the light guide member arranged between, and in close proximity to, light sources of the illumination device may provide less light, i.e., appear darker, than portions of the light guide member arranged substantially along a zero-degree radiation angle of the respective light source.

Figure 1:
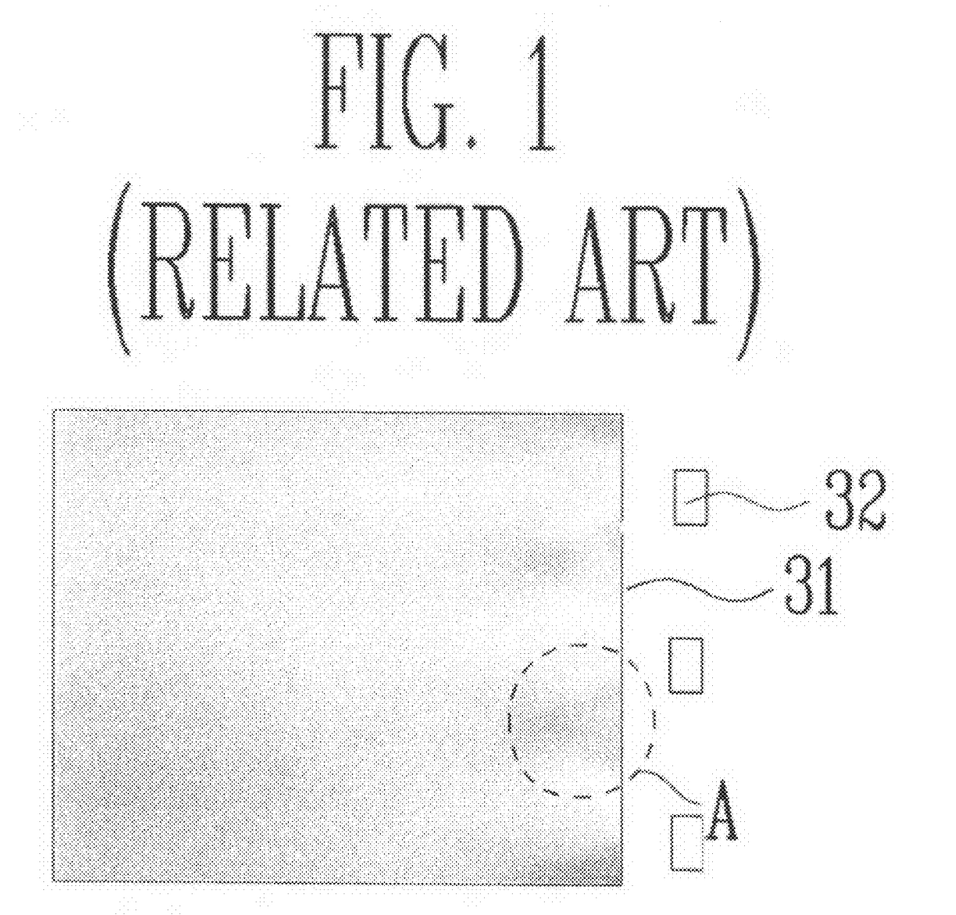
FIG. 1 illustrates a photograph of a luminance distribution of a conventional light guide member.

More particularly, in general, as the radiation angle of light from the light source increases, light intensity decreases. The diffusion of light is also generally weak at a portion of a light guide member close to the light source. Thus, e.g., at portions of the light guide member receiving light from the light source via relatively larger radiation angles and/or beyond a radiation angle of the light, the intensity of light output from the light guide member may not have a uniform luminance distribution. As a result of such non-uniformity, a luminance distribution of light from the light guide member may include a bright line, bright area and/or dark area close to the light source, i.e., a bright line/area effect. FIG. 1 illustrates a photograph of a brightness distribution of a conventional light guide member 31. As may be seen from FIG. 1, as a result of the bright line/area effect, a dark portion A exists between light sources 32. Such a bright line/area effect may be particularly prominent at portions of the light guide member that do not overlap with or are not aligned with light sources of a light source unit. When light having a non-uniform luminance distribution is provided to a display device, image quality of the display device may be hindered.

In view of such shortcomings of the light guide member, a BLU employing such light guide members may include a plurality of optical sheets, e.g., a diffusion sheet and a prism sheet, in an attempt to provide light having a more uniformly distributed luminance to the display device. However, having to provide additional optical sheets may increase, e.g., the cost, weight and/or size of the BLU.

SUMMARY OF THE INVENTION

It is a feature of embodiments of the present invention to provide a light guide member and a backlight unit including such a light guide member, which substantially overcome one or more of the problems due to limitations and disadvantages of the related art.

It is therefore a feature of embodiments of the invention to provide a backlight unit employable by a display device and capable of providing light with a substantially uniform and/or completely uniform luminance distribution and high brightness.

It is therefore a separate feature of embodiments of the invention to provide a method of fabricating a light guide panel including a side that includes a plurality of V-like grooves with different pitches.

At least one of the above and other features and advantages of the invention may be realized by providing a light guide member capable of guiding light received from at least a first light source and second light source, wherein the first light source is spaced a distance D3 from the second light source, the light guide member including a first side including a plurality of first grooves extending along a first direction and a plurality of second grooves extending along the first direction, wherein the first grooves may have a first pitch and the second grooves having a second pitch, and the first pitch may be different from the second pitch.

The first side may include a first portion and a second portion, wherein the first grooves may be formed on the first portion and the second grooves being formed on the second portion. The second portion may correspond to one or more areas extending from a first end portion of the first side of the light guide member. The light guide member may include a second end portion that is opposite to the first end portion, wherein the second end portion may correspond to at least a portion of the first portion of the first side and may be free of the second grooves. The second portion may include a plurality of sub-second-portions spaced apart from each other along a first side of the light guide member. At least some of the first grooves may extend between the plurality of sub-second-portions.

Each of the plurality of sub-second-portions may correspond to one of a triangular shaped portion, a semi-circular shaped portion and a polygonal shape portion on the first side of the light guide member. The second pitch may be less than the first pitch. The second pitch may be about 5% to about 80% of the first pitch. The second pitch may be about 10% of the first pitch. The first grooves may have a first depth and the second grooves may have a second depth, wherein the first depth may be different from the second depth.

The first depth may be larger than the second depth. The second depth may be about 40% to about 60% of the first depth. The second depth may be about 50% of the first depth. The first side may include a first end portion and a second end portion, wherein the first end portion may be opposite to the second end portion along a second direction perpendicular to the first direction, and the second grooves may be arranged on at least a portion of the first end portion. At least one of the first pitch and the second pitch may change approaching away from the first end portion toward the second end portion. The first pitch may decrease approaching away from the first end portion toward the second end portion.

The plurality of sub-second portions may correspond to a triangular shaped portion, wherein the triangular shaped portion may have a base extending a first distance D1 along an edge of the first end portion and a height extending a second distance D2 away from the edge of the first end portion along the second direction, and the distance D2 may be about 95% to about 105% of the first distance D1. The plurality of sub-second portions may correspond to a triangular shaped portion, wherein the triangular shape portion may have a base extending a first distance D1 along an edge of the first end portion and a height extending a second distance D2 away from the edge of the first end portion along the second direction, wherein the first distance D1 may be about 60% to about 80% of the distance D3.

The light guide member may include at least one of an acrylic resin and a polycarbonate resin. The light guide member may include a second side opposite to the second side, wherein the second side may include a plurality of third grooves extending along a second direction and the second direction may be substantially perpendicular to the first direction. The first grooves and the second grooves may have substantially v-like or triangular-like cross-sectional shapes, taken along a direction crossing the first direction.

At least one of the above and other features and advantages of the invention may be separately realized by providing a backlight unit (BLU) employable by a display device including a display panel, the backlight unit including a light source unit including a plurality of light sources, an optical member, and a light guide member arranged to receive light from the plurality of light sources spaced apart from each other by a distance D3, the light guide member may include a first side including a plurality of first grooves extending along a first direction and a plurality of second grooves extending along the first direction, the first grooves having a first pitch and the second grooves having a second pitch, wherein the first pitch may be different from the second pitch and the optical member may provide light from the light guide member to the display panel.

The light sources may include a cold cathode fluorescent tube and a LED. The optical member may include a prism sheet. The BLU may further include a reflective member for reflecting light incident thereon toward the light guide member, wherein the reflective sheet and the optical member may sandwich the light guide member therebetween.

At least one of the above and other features and advantages of the invention may be separately realized by providing a method for fabricating a light guide member from a light guide member material, the light guide member guiding light received from a light source, and including a first side including a plurality of first grooves extending along a first direction and a plurality of second grooves extending along the first direction, the method including preparing a mold core, cutting at least one predetermined region from the mold core forming at least forming at least one cut-out portion and a remaining mold core portion, forming a first pattern on the remaining mold core portion, the first pattern including at least one of a plurality of projections and grooves extending along a first direction, forming a second pattern on the at least one cut-out portion, with a pitch different than that of the first extruded pattern in the divided mold core, assembling the mold core by combining the at least one cut-out portion and the remaining mold core portion, the first pattern and the second pattern being arranged on a same side of the assembled mold core, and molding the first grooves and the second grooves on a first side of the material for forming the light guide member corresponding to the first and second patterns, respectively, using the assembled mold core.

The method may include forming a plurality of third grooves on a second side of the material for forming the light guide member, wherein the third grooves may extend perpendicular to the first grooves and the second grooves. Forming the first and second patterns may include forming the first and second patterns using a bite.

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Korean Patent Application No. 10-2006-0062734, filed on Jul. 4, 2006, in the Korean Intellectual Property Office, and entitled: "Backlight Unit of a Liquid Crystal Display Device and Method for Fabricating a Light guide member of the Same," is incorporated by reference herein in its entirety.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In the following description, references made to "first," "second," etc. merely serve to identify different elements and/or features of different elements and, unless specified otherwise, the features may or may not have the same values.

Figure 2:
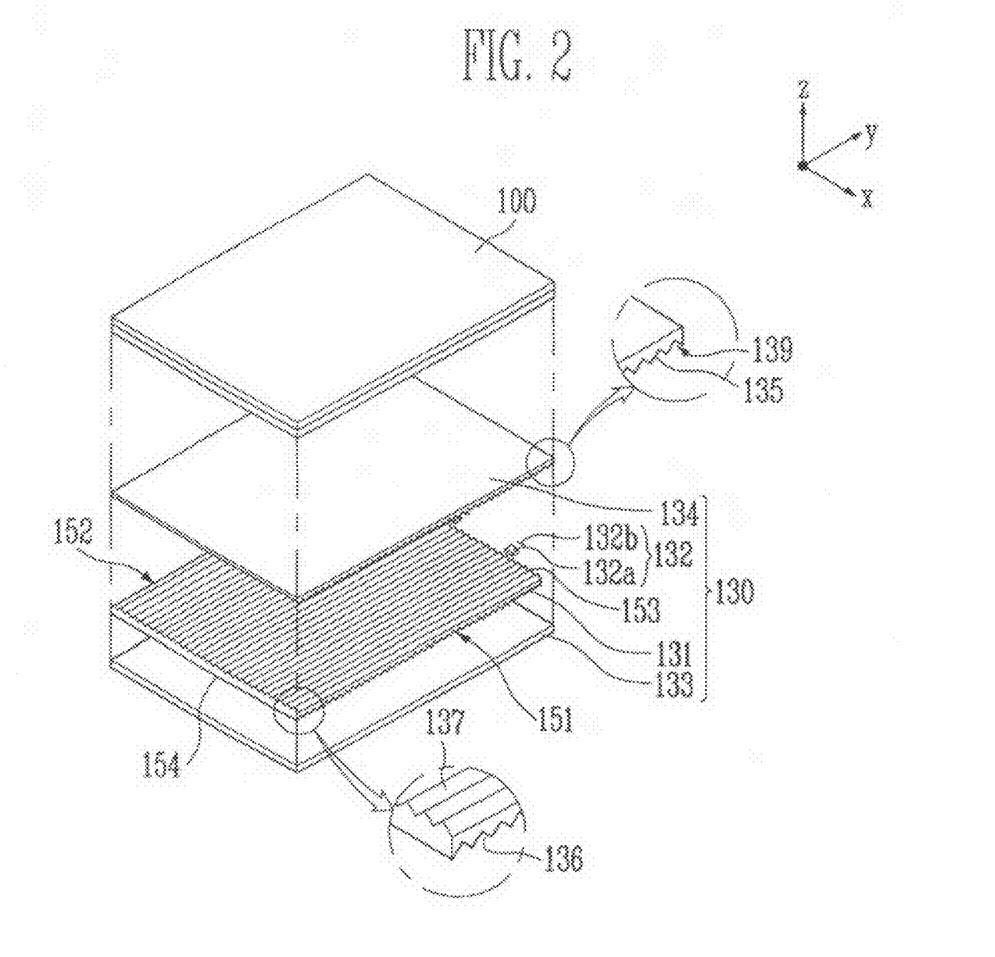
FIG. 2 illustrates an exploded perspective view of parts of an exemplary LCD device employing an exemplary embodiment of a LCD device comprising a backlight unit according to the invention.

FIG. 2 illustrates an exploded perspective view of parts of an exemplary LCD device employing an exemplary embodiment of a LCD device comprising a backlight unit according to the invention.

Referring to FIG. 2, a LCD device may include a LCD panel 100 and a backlight unit (BLU) 130. The BLU 130 may provide light to the liquid crystal panel 100 such that images may be displayed on the liquid crystal panel 100.

The LCD panel 100 may include two substrates disposed opposite each other, a liquid crystal layer provided between the two substrates, and a pixel region (not shown) defined by, e.g., a plurality of gate lines and data lines arranged on the substrates in, e.g., a matrix-type manner. A thin film transistor and a pixel electrode may be formed at respective portions of one of the substrates corresponding to intersecting portions of the gate lines and data lines formed thereon (not shown). Each pixel electrode may be connected to the respective thin film transistor, and each thin film transistor may control signals respectively supplied to the respective pixel(s). A color filter (not shown) and a common electrode (not shown) may be formed on the other of the substrates. A polarizing film (not shown) may be provided on an outer side of each of the substrates.

The BLU 130 may include a light guide member 131, a light source unit 132, an optical member 134, and a reflective member 133. The light source unit 132 may supply light to the light guide member 131. The light guide member 131 may change a distribution of light provided from the light source unit 132. The reflective member 133 may reflect light received thereon back toward the LCD panel 100.

The optical member 134 may collect and reflect the light having a uniform luminance distribution, help enhance brightness of the display device and/or only allow light with a predetermined incident angle to pass through. For example, the optical member 134 may include a prism sheet that only allows substantially vertical light to pass through, while light having other incident angles may be reflected toward the reflective member 133 before being reflected back again toward the optical member 134 until the light vertically passes through the optical member 134 toward the LCD panel 100.

The light guide member 131 may change a distribution of light concentrated on a plurality of small areas thereof, and may thereby, provide uniform light over a relatively larger area corresponding to, e.g., the plurality of small areas and/or an entire area of, e.g., the second side of the light guide member. The light guide member 131 may have a thin-plate-like shape, e.g., cuboid shape. The light guide member 131 may include, e.g., transparent resin such as, e.g., acryl or polycarbonate, etc.

Referring to FIG. 2, the light guide member 131 may include a first side 151, a second side 152, a third side 153, and a fourth side 154. The first side 151 and the second side 152 may oppose each other, and the third side 153 and the fourth side 154 may oppose each other. More particularly, the third side 153 and the fourth side 154 may extend between and connect respective portions of the first side 151 and the second side 152 together. The first side 151, e.g., reflective side, of the light guide member 131 may face the reflective member 133 of the BLU 130, and the second side 152, e.g., exit side, of the light guide member 131 may face the optical member 134.

The light source unit 132 may include one or more light sources 132a disposed on one or more sides, e.g., the third side 153, of the light guide member 131 and one or more reflective panels 132b reflecting light radiated from the light source(s) 132a back toward the light guide member 131. A point light source, such as a light emitting diode (LED) light-emitting white light, may be used as the light source 132a, and one or more light sources may be arranged depending on a size of the light guide member 131. A BLU may employ, e.g., a cold cathode fluorescent lamp (CCFL) and/or an LED as a light source 132a. CCFLs may generally be employed in BLUs for larger-sized display devices, and LEDs may generally be employed in BLUs for smaller-sized display devices.

In the exemplary embodiment of the BLU illustrated, the light sources 132a are arranged on a single side, i.e., the third side 153, of the light guide member. That is, in embodiments of the invention, the light guide member 131 may only receive light from one side, e.g., the third side 153 of the light guide member 131. However, embodiments of the invention are not limited to such an arrangement.

The optical member 134 may include a prism sheet. In embodiments of the invention, the optical member 134 may only include a prism sheet. In embodiments of the invention, the optical member 134 may not include a diffusion sheet. Referring to FIG. 2, the optical member 134 may include one or more grooves 135 formed on a side 139 facing the light guide member 131. The prism sheet of the optical member 134 may help improve the vertical directionality of the light by diffusing and collecting light incident from the light guide member 131 in a vertical direction toward, e.g., the LCD panel 100.

The light guide member may include first grooves 136 and/or second grooves 137. The first grooves 136 may extend along a first direction, e.g., x-direction, on the first side 151 of the light guide member 131. The first direction may be substantially perpendicular to a zero-degree radiation angle of light emitted from the light source 132a of the BLU 130. The second grooves 137 may extend along a second direction, e.g., y-direction, on the second side 152 of the light guide member 131. The second direction may be substantially parallel to the zero-degree radiation angle of light emitted from the light source 132a of the BLU 130. The first grooves 136 and the second grooves 137 may extend along directions that are substantially orthogonal to each other. When light is provided to one or more sides, e.g., the third side 153, of the light guide member 131, an optical path and distribution of the received light may be changed by the first and second grooves 136, 137.

The first grooves 136 and/or the second grooves 137 may be substantially V-shaped or triangular-shaped grooves. More particularly, in embodiments of the invention, irrespective of a depth and/or a width of the first grooves 136 and/or the second grooves 137, a cross-sectional shape of the first grooves 136 and/or the second grooves 137 may be substantially V-shaped or triangular-shaped, as taken along a line extending along the second direction and the first direction, respectively. Embodiments of the invention are not limited to such structures. For example, the first grooves 136 may be formed on the second side 152 of the light guide member 131, and the second grooves 137 may be formed on the first side 151 of the light guide member 131.

Figure 3A:
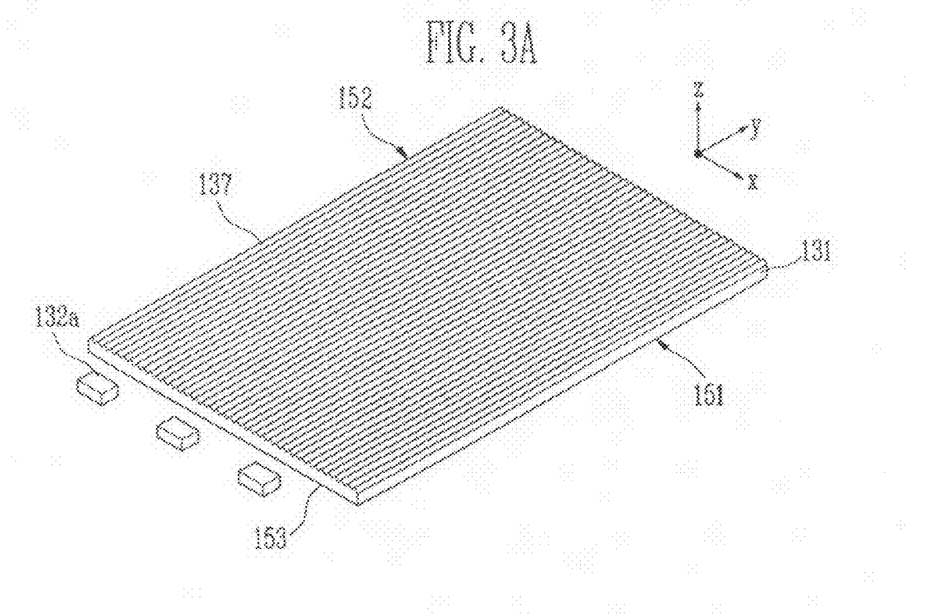
FIG. 3A illustrates a top-side perspective view of a first exemplary embodiment of a light guide member employing one or more aspects of the invention.
Figure 4A:
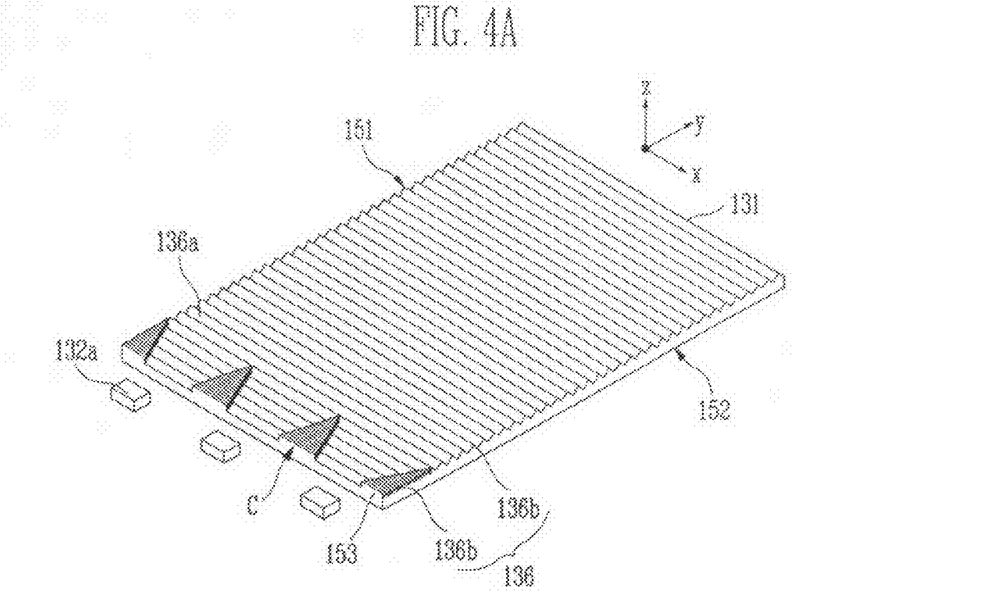
FIG. 4A illustrates a bottom-side perspective view of the first exemplary embodiment illustrated in FIG. 3A.

FIG. 3A illustrates a top-side perspective view of a first exemplary embodiment of a light guide member employing one or more aspects of the invention and FIG. 4A illustrates a bottom-side perspective view of the first exemplary embodiment illustrated in FIG. 3A.

Referring to FIG. 3A, in the first exemplary embodiment of the light guide member 131 employing one or more aspects of the invention, a plurality of the second grooves 137 may be formed on the second side 152 of the light guide member 131. The second grooves 137 may extend, e.g., along the second direction, e.g., y-direction, which may be parallel to a zero-degree radiation angle of light emitted from the light sources 132a.

Figure 3B:
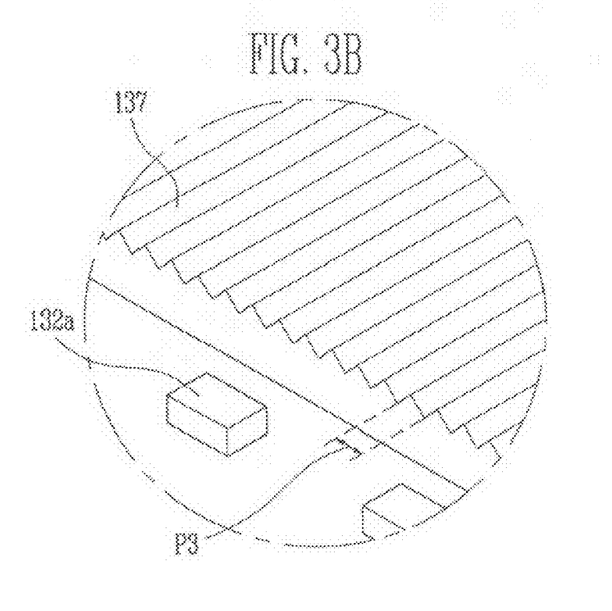
FIG. 3B illustrates an enlarged view of a circled portion of the exemplary embodiment of the light guide member illustrated in FIG. 3A.

FIG. 3B illustrates an enlarged view of a circled portion of the exemplary embodiment of the light guide member illustrated in FIG. 3A. Referring to FIG. 3B, the plurality of second grooves 137 may be arranged at a third pitch P3. In embodiments of the invention, the third pitch P3 may be substantially or completely constant across an entire side e.g., second side 152, of the light guide member 131.

Referring to FIG. 4A, in the first exemplary embodiment of the light guide member 131, a plurality of the first grooves 136 may be formed on the first side 151 of the light guide member 131. The first grooves 136 may extend, e.g., along the first direction, e.g., x-direction, which may be perpendicular to the zero-degree radiation angle of the light emitted from the light sources 132a. In embodiments of the invention, the light guide member 131 may extend along a plane extending along the first and second directions, e.g., x-y plane.

Figure 4B:
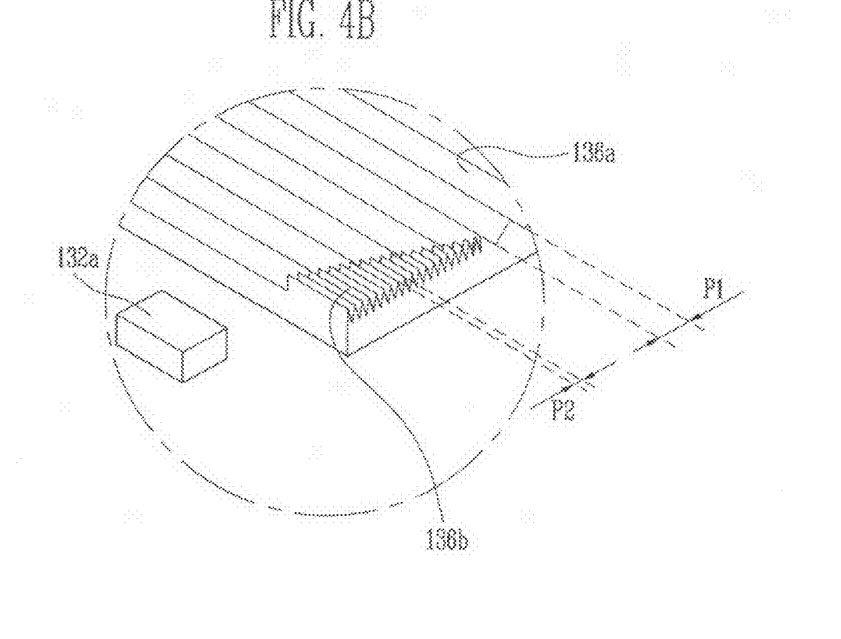
FIG. 4B illustrates an enlarged view of a circled portion of the exemplary embodiment of the light guide member illustrated in FIG. 4A.

FIG. 4B illustrates an enlarged view of a circled portion of the exemplary embodiment of the light guide member illustrated in FIG. 4A. Referring to FIG. 4B, the first grooves 136 may include first-pitch-first grooves 136a and second-pitch-first grooves 136b. In embodiments of the invention, the first-pitch-first grooves 136a and/or the second-pitch-first grooves 136b may have substantially V-shaped or triangular-shaped cross section shapes, taken along the second and first directions, respectively. The first-pitch-first grooves 136a may be formed on a first region of the first side 151 of the light guide member 131 and the second-pitch-first grooves 136b may be formed on a second region of the first side 151 of the light guide member 131.

For example, as illustrated in FIG. 4A, the second-pitch-first grooves 136b may be formed on a second-pitch region C of the first side 151. The first-pitch-first grooves 136a may be formed on a remaining portion of the first side 151 of the light guide member 131. In embodiments of the invention, the first-pitch-first grooves 136a may be arranged on some or all of the remaining portion of the first side 151 of the light guide member 131. The first-pitch-first grooves 136a may have a first pitch P1 and the second-pitch-first grooves 136 may have a second pitch P2.

As illustrated in FIG. 4A, the second-pitch region C may correspond to a portion(s) of the first side 151 close to the light source(s) 132a. For example, one or more the second-pitch regions C may be arranged at side end portions of the first side 151 close to the third side 153 of the light guide member. Some of the first-pitch-first grooves 136a may be arranged between respective second-pitch regions C, as illustrated in FIG. 4A. In the following description, the term pitch refers to a distance between a starting point of a groove and a starting point of a next groove. Although the second-pitch region(s) C may be referred to as "second-pitch" regions, one, some or all of the second pitch region(s) may have grooves formed thereon that have a different pitch relative to grooves formed on other second-pitch region(s) C and/or a pitch of the grooves formed on each of the second-pitch-region(s) C may not be constant.

In embodiments of the invention, all of the first-pitch-first grooves 136a may have a same pitch and/or all of the second-pitch-first grooves 136 may have a same pitch. However, embodiments of the invention are not limited to such structures. For example, in embodiments of the invention, the pitch of the first-pitch-first grooves 136a may, e.g., decrease, increase or vary approaching away from the light source 132a. Similarly, the pitch of the second pitch-first-grooves 136 may, e.g., decrease, increase or vary approaching away from the light source 132a. Also, in embodiments of the invention, the first-pitch-first grooves 136a may be different from the second-pitch-first grooves 136b based on characteristics other than pitch such as, e.g., differences in depth(s) of the grooves.

In embodiments of the invention, the second-pitch regions C may correspond to portions of the light guide member 131 that do not align with or overlap with the light source 132a, along the second direction, e.g., y-direction. Referring to FIG. 4A, the second-pitch regions C may correspond to portions of the light guide member 131 between adjacent ones of the light sources 132a.

In embodiments of the invention, the second-pitch regions C may be formed, e.g., to completely or partially cover end portions of the first side 151 that do not overlap with or align with one of the light sources 132a along the second direction. For example, the second-pitch region C may be a region(s) outside a predetermined range of radiation angles of light radiated from the light source 132a toward a region between the light sources 132a.

In embodiments of the invention, the second-pitch region C may have a substantially triangular-shape on the first side 151 of the light guide member 131. However, embodiments of the invention are not limited to such shapes for the second-pitch region(s) C. For example, the second-pitch region C may have a polygonal shape or a semi-circular shape.

Figure 5:
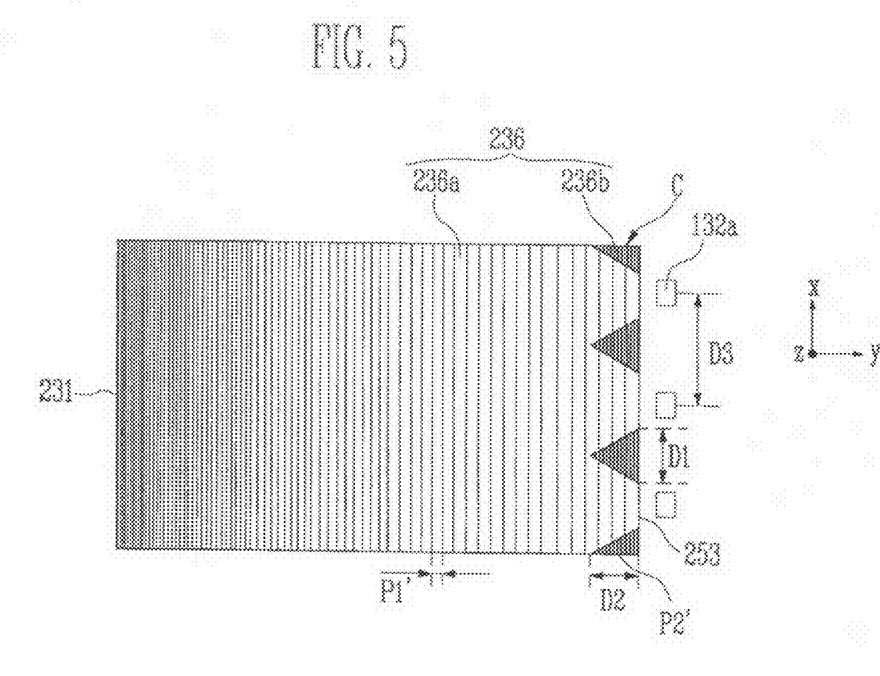
FIG. 5 illustrates a top-plan view of a second exemplary embodiment of a light guide member employing one or more aspects of the invention.

FIG. 5 illustrates a top-plan view of a second exemplary embodiment of a light guide member 231 employing one or more aspects of the invention. Referring to FIG. 5, the second-pitch region C may extend a first distance D1 along the first direction, e.g., x-direction, and may extend a distance D2 along the second direction, e.g., y-direction. As shown in FIG. 5, a third distance D3 may exist between adjacent light sources 132a. In embodiments of the invention, the second distance D2 may be about 95% to about 105% of the first distance D1 and/or the first distance D1 may be about 60% to about 80% of the third distance D3 between adjacent light sources 132a. In embodiments of the invention in which the second-pitch region C has a triangular shape, e.g., exemplary second-pitch region illustrated in FIG. 5, a size, i.e., area, of the triangular shaped second-pitch region C may be obtained using, e.g., Equation 1 and Equation 2 below.

$$D1 = (0.75)*D3, D2 = D1$$ [Equation 1]

In Equation 1, D3 is a distance between the light sources 132a, D1 is a distance the second-pitch region C extends along the first direction, i.e., a length of a base of the triangular shape, and D2 is a distance the second-pitch region C extends along the second direction, i.e., a height of the triangular shape.

$$\text{Area of triangular shaped second-pitch region } C = (D1 \times D2)/2$$ [Equation 2]

Referring to FIG. 5, the second exemplary light guide member 231 may include first grooves 236, including first-pitch-first grooves 236a and second-pitch-first grooves 236b. In embodiments of the invention, a first pitch P1' of the first-pitch-first grooves 236a may decrease approaching away from the light source 132a, i.e., from a third side 253 of the light guide member 231. In embodiments of the invention, a second pitch P2' of the second-pitch-first grooves 236b may be about 5% to about 80% of the first pitch P1' of the first-pitch-first grooves 136a. For example, the second pitch P2' may be about 10% of the first pitch P1'.

In embodiments of the invention, the second pitch P2' may decrease, approaching away from the light source 132a. In such embodiments, the second pitch P2' may be about 5% to about 80% of the first pitch P1' of the first-pitch-first grooves 136a neighboring the second-pitch-first grooves 136b. Such neighboring first-pitch-first grooves 136a may, e.g., directly contact a portion of the second-pitch-first grooves 136b, may be, e.g., extend between adjacent second-pitch regions C, may be arranged in relatively close proximity to the respective second-pitch region C and/or may correspond to a pitch P1' of a closest one of the first-pitch-first grooves 136a to the respective second-pitch-first grooves 136b and/or respective second-pitch region C. In other embodiments of the invention, both the first pitch P1' and the second pitch P2' may change, e.g., decrease, approaching away from the light source 132a.

Figure 6A:
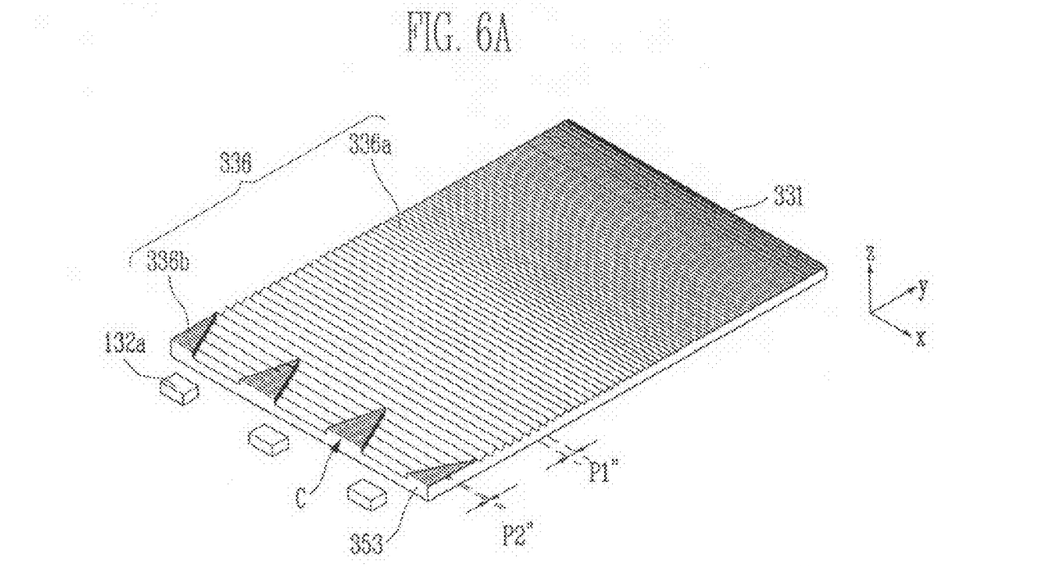
FIG. 6A illustrates a top-side perspective view of a third exemplary embodiment of a light guide member employing one or more aspects of the invention.
Figure 6B:
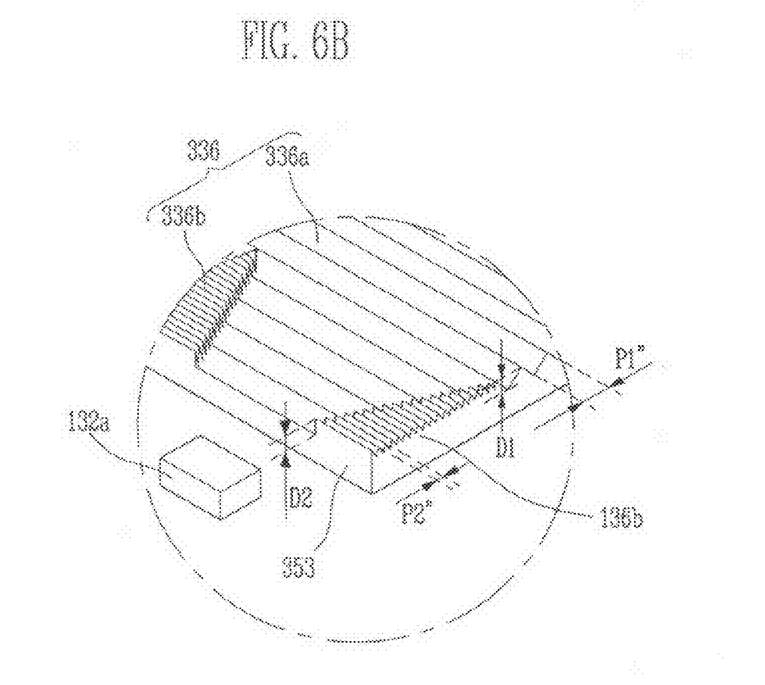
FIG. 6B illustrates an enlarged view of a circled portion of the exemplary embodiment of the light guide member illustrated in FIG. 6A.

FIG. 6A illustrates a top-side perspective view of a third exemplary embodiment of a light guide member employing one or more aspects of the invention, and FIG. 6B illustrates an enlarged view of a circled portion of the exemplary embodiment of the light guide member illustrated in FIG. 6A.

Referring to FIGS. 6A and 6B, the third exemplary embodiment of a light guide member 331 may include first grooves 336 including first-pitch-first grooves 336a and second-pitch-first grooves 336b. A first pitch P1" of the first-pitch-first grooves 336a and/or a second pitch P2" of the second-pitch-first grooves 336b may change approaching away from the light source 132a, i.e., away from a third side 353 of the light guide member 331.

As illustrated in FIG. 6B, in embodiments of the invention, a first depth D1 of the first-pitch-first grooves 336a and/or a second depth D2 of the second-pitch-first grooves 336b may change approaching away from the light source 132a, i.e., third side 353 of the light guide member 331. In other embodiments of the invention, the first depth D1 and the second depth D2 may be different, but may remain constant. As illustrated in FIGS. 6A and 6B, the second depth D2 of the second-pitch-first grooves 336b may be less than the first depth D1 of the first-pitch-first grooves 336a. In embodiments of the invention, the second depth D2 of the second-pitch-first grooves 336b may be about 40% to about 60% less than the first depth D1 of the first-pitch-first grooves 336a. For example, the second depth D2 may be about 50% of the first depth D1.

In the following description, reference may only be made to the first exemplary embodiment of the light guide member 131. However, unless specified otherwise, features described below may apply to similar features in other embodiments of the invention, e.g., second and third exemplary light guide members 231, 331.

Although the exemplary embodiments illustrated in the accompanying Figures illustrate the first grooves 136 on the first side 151 of the light guide member 131, embodiments of the invention are not limited to such an arrangement. For example, the first grooves 136 may be formed on, e.g., the second side 151 of the light guide members 131, 231, 331. Although the embodiment described above describes the structure that the V-grooves 136a and 136b are formed on the lower face of the light guide member 131, it is possible to implement the structure that the V-grooves 136a and 136b are formed on the upper face of the light guide member 131.

An exemplary operation of the light guide member 131 is described below with reference to FIG. 2. Light may be emitted from the light source 132a toward the light guide member 131. For example, light from the light source 132a may be emitted toward the first side 151 of the light guide member 131. The light from the light source 132a may then be guided and provided to the LCD panel 100 via the light guide member 131 employing one or more aspects of the invention.

An intensity of the light emitted from the light source 132a may decreases as a radiation angle of the emitted light increases. In embodiments of the invention including, e.g., the second-pitch-first grooves 136b, an amount of light reflected and an amount of dispersion of the emitted light may be increased as a result of the second-pitch-first grooves 136b. For example, more light may be dispersed and/or reflected as a result of smaller pitched second-pitch-first-grooves 136b that may be formed at end portions of the light guide member, e.g., 131, close to and/or between the light source 132as. As a result of, e.g., such increase in the dispersion and/or amount of light reflected from, e.g., second-pitch region(s) C, which may correspond to portions of the light guide member located outside a predetermined radiation angle of the light from the light sources, an intensity of light exiting from the light guide member may be completely and/or substantially completely uniform.

A portion of light incident on the light guide member, e.g., 131, may be emitted to, e.g., the second side 152 of the light guide member 131 by the first and second grooves 136, 137, and other portion(s) of the incident light may progress inside the light guide member 131. An outgoing angle of the light exiting the light guide member 131 may be guided by, e.g., the first and/or the second grooves 136, 137 so that the light may be collected, provided and/or guided in a constant and/or substantially constant direction, and may have a substantially uniform and/or completely uniform luminance distribution.

Other portions of the incident light may be emitted toward the first side 151 of the light guide member 131, and may exit from, e.g., the first side 151 of the light guide member 131 before being reflected by, e.g., the reflective member 133 and directed toward the light guide member 131. The light reflected by the reflective member may then exit from, e.g., the second side 152 of the light guide member 131 while maintaining the uniform and/or substantially uniform luminance distribution and the constant and/or substantially constant direction of the exiting light. The light substantially uniformly and/or uniformly distributed in the constant and/or substantially constant direction may be emitted from, e.g., the second side 152 of the light guide member to the optical member 134, and then, may be substantially and/or completely uniformly emitted along a third direction, e.g., z-direction, to a surface, e.g., entire surface, of the LCD panel 100 via, e.g., the groove(s) of the prism sheet of the optical member 134.

Figure 7:
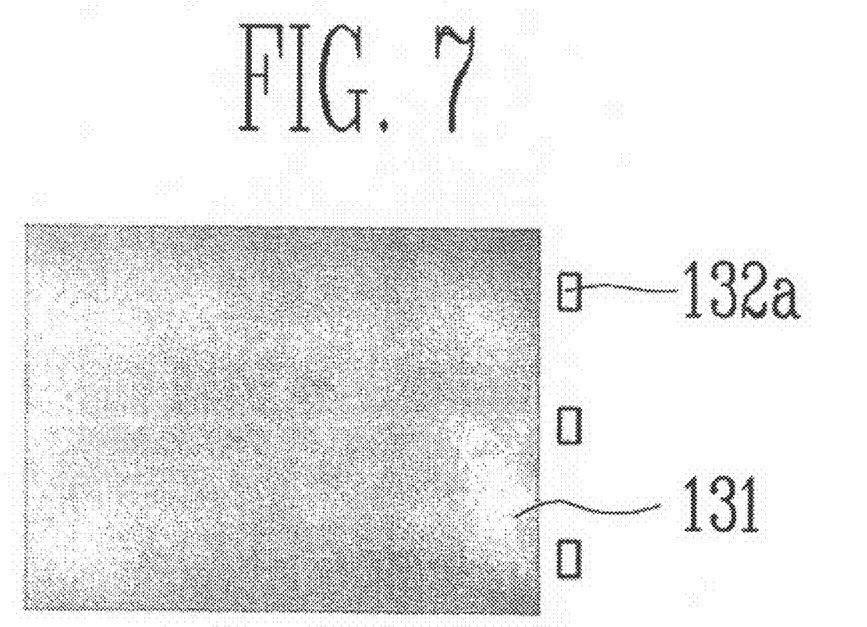
FIG. 7 illustrates a photograph of a luminance distribution of a light guide member employing one or more aspects of the invention.

FIG. 7 illustrates a photograph of a luminance distribution of a light guide member employing one or more aspects of the invention. As may be seem from FIG. 7, light emitted from a light guide member employing one or more aspects of the invention may have a more uniform and/or completely uniform luminance distribution than light emitted from a conventional light guide member, as illustrated in FIG. 1. As may be seen from FIG. 7, the light emitted from the light guide member employing one or more aspects of the invention has a uniform brightness distribution and is emitted from an entire area of the light guide member.

For example, comparing FIG. 7 to FIG. 1, it may be determined that light emitted from a light guide member employing one or more aspects of the invention may have a more uniform luminance distribution than light output from the convention light guide member. More particularly, the luminance distribution of the light guide member employing one or more aspects of the invention is free of the dark portion(s) A, which are visible in FIG. 1, corresponding to the conventional light guide member.

As discussed above, the light uniformly distributed in a constant direction may be incident to the optical member 134, and may be emitted in a vertical direction, e.g., z-direction, to the entire surface of the LCD device 100 via the grooves 135 of the prism sheet of the optical member 134.

The light guide member 131 employing one more aspects of the invention may be fabricated using, e.g., an exemplary method described below. It may be difficult to fabricate, e.g., the light guide member 131 including the first-pitch-first grooves 136a and the second-pitch-first-grooves 136b using a conventional method of fabricating a light guide member because, e.g., it may difficult to form the second-pitch-first grooves 136b on a portion of, e.g., the second-pitch region C of, e.g., the first side 151 of the light guide member 131. Embodiments of a method of fabricating a light guide member employing one or more aspects of the invention may employ a multiple-piece mold core with grooves having different characteristics on respective pieces of the multiple-piece mold core. For example, a mold core may be divided into a plurality of pieces and then combined together.

FIGS. 8A to 8E illustrate cross-sectional views of resulting structures formed during an exemplary embodiment of a method of fabricating the exemplary light guide member 131 according to one or more aspects of the invention.

Figure 8A:
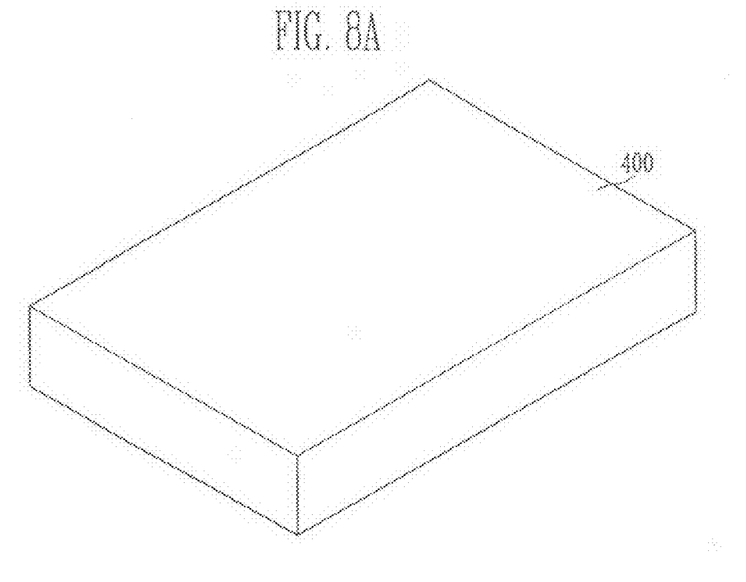
FIGS. 8A to 8E illustrate cross-sectional views of resulting structures formed during an exemplary embodiment of a method of fabricating a light guide member according to one or more aspects of the invention.

Referring to FIG. 8A, a mold core 400 may be prepared. The mold core 400 may include, e.g., a metal(s) with a relatively high hardness, e.g., Stavax, Sux, etc.

Figure 8B:
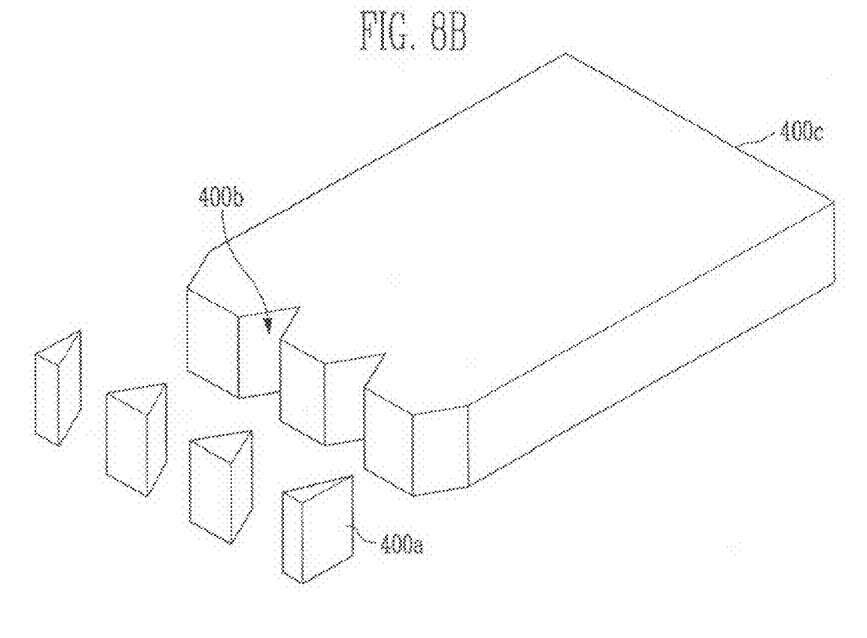

Referring to FIG. 8B, the mold core 400 may be divided into a plurality of pieces. A predetermined region(s) corresponding to, e.g., second-pitch region(s) C may be cut away from the mold core 400. For example, a plurality of pieces may be cut away from, e.g., one side of the mold core 400, resulting in cut-out portion(s) 400a and a remaining mold core portion 400c including groove(s) 400b, which may have shapes corresponding to respective sides of the cut-out portion(s) 400a, respectively. Although in the exemplary embodiment illustrated in FIGS. 8A to 8E, the cut-out portions 400a correspond to an entire height of the mold core 400 along the third direction, e.g. z-direction, embodiments of the invention are not limited to such structures. For example, the cut-out portion(s) 400b may correspond to only a portion of mold core 400 along each direction, i.e., x-direction, y-direction and z-direction.

Each of the cut-out portion(s) 400a may correspond to one of the second-pitch-region(s) C. In embodiments of the invention, the cut-out portions 400a may have a triangular shape, a polygonal shape and/or a semi-circular shape. In embodiments of the invention in which the cut-out portion(s) 400a may have a triangular shape, a height of the triangular shape cut-out portion 400a may be about 95% to about 105% of a length of a base side of the triangular shape.

As discussed above, in embodiments of the invention, each of the second-pitch region(s) C may correspond to a portion of the light guide member 131 that is outside a predetermined range of a radiation angle of light emitted thereon from the light source 132a, i.e., portions of the light guide member 131 close to and between adjacent ones of the light sources 132a.

Figure 8C:
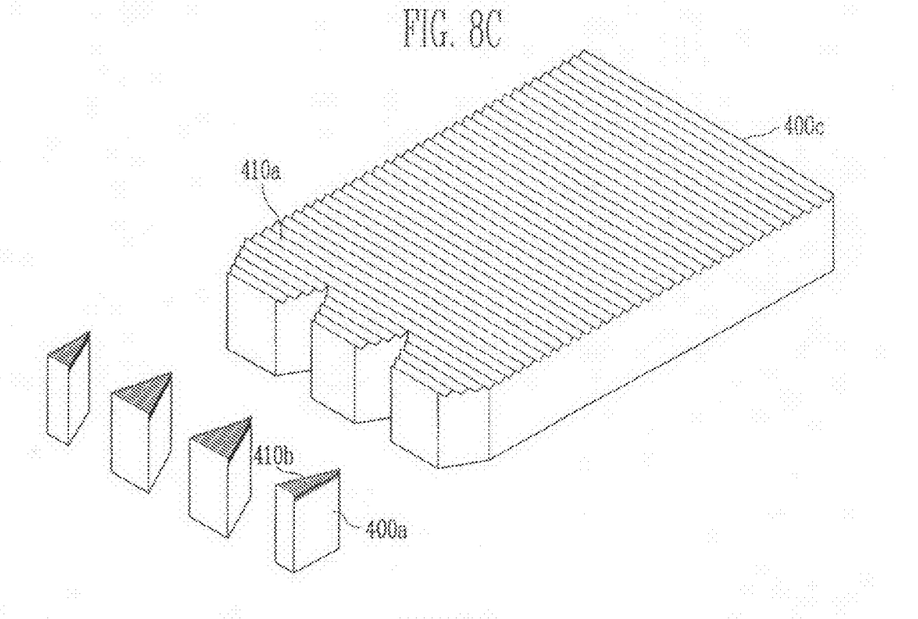

Referring to FIG. 8C, a first pattern 410a may be formed on the remaining mold core portion 400c. The first pattern 410a may be formed using, e.g. (not shown) that may be composed of, e.g., diamond, etc. A second pattern 410b may be formed on the cut-out portion(s) 400a. The first pattern 410a and/or the second pattern 410b may include a plurality of protrusions. The first pattern 410a and the second pattern 410b may correspond to an inverse pattern, e.g., opposite shape, of the first-pitch-first grooves 136a and the second-pitch-first-grooves 136b, respectively.

A pitch associated with the first pattern 410a may be different from a pitch associated with the second pattern 410b. In embodiments of the invention, a pitch associated with some or all of the patterns formed on each of the cut-out portion(s) 400a may be different from a pitch associated with other cut-out portion(s) and may be constant or non-constant.

For example, the first pattern 410a may have a constant pitch or may have a changing pitch, e.g., a decreasing pitch. The pitch of the second pattern 410b may be smaller than the pitch of the first pattern 410a. The pitch of the second pattern 410b may be about 5% to about 80% of the pitch of the first pattern 410a. For example, the pitch of the second pattern 410b may be about 10% of the pitch of first pattern 410a.

In embodiments of the invention, the first pattern 410a may be different from the second pattern 410a in other ways, e.g., height of the projections, etc. That is, e.g., as discussed above, the first pattern 410a may include projections having a different pitch and a different height than projections associated with the second pattern 410b. More particularly, e.g., the first pattern 410a may include projections having a larger pitch and a larger height than projections associated with the second pattern 410b. For example, a height of the projections associated with the second pattern 410b may be about 40% to about 60% of a height of the projections associated with the first pattern 410a.

Figure 8D:
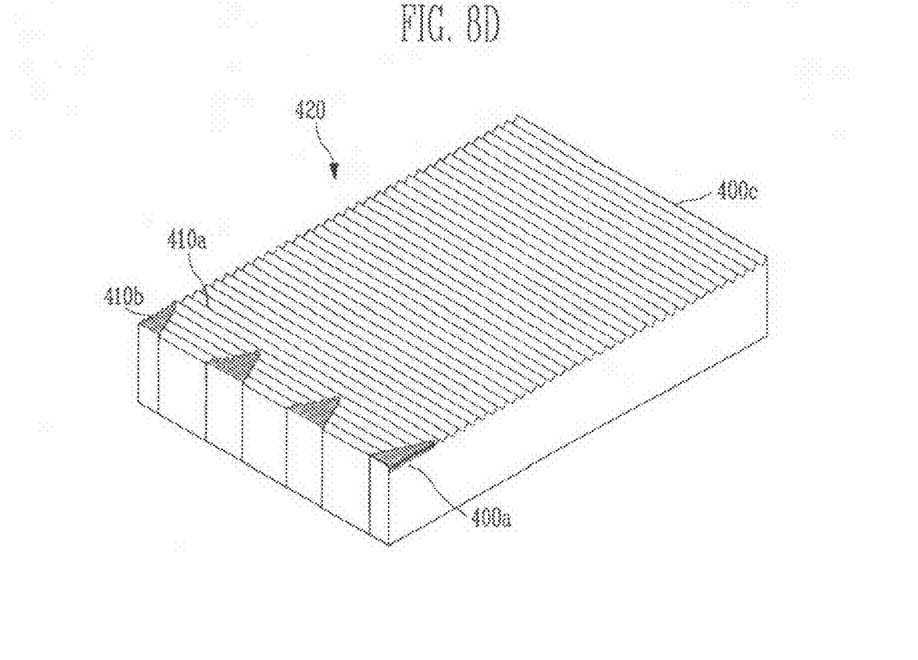

Referring to FIG. 8D, a stamper 420 may be assembled by combining or attaching the cut-out portion(s) 400a with the remaining mold core portion 400c by, e.g., inserting the cut-out portion(s) 400a in the grooves 400b.

Figure 8E:
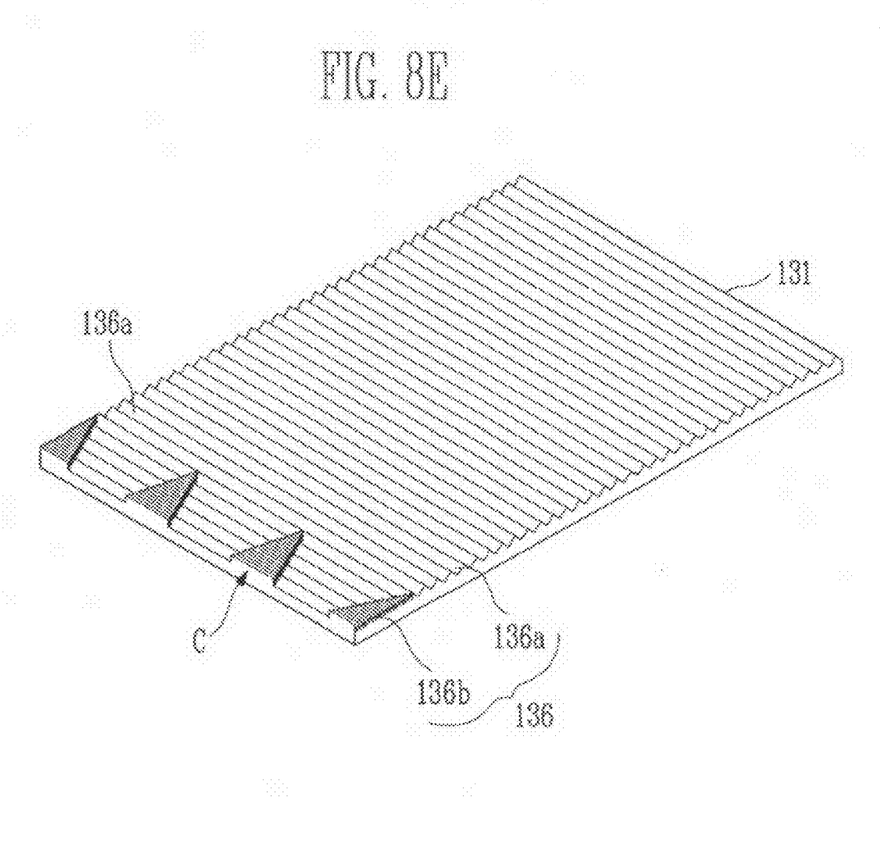

Referring to FIG. 8E, the stamper 420 may be used to form the first-pitch-first grooves 136a and the second-pitch-first grooves 135b on, e.g., the first side 151 of thin-plate like, e.g., cuboid, shaped member, thereby forming the light guide member 131. The first-pitch-first grooves 136a and the second-pitch-first grooves 136b have shapes that inversely correspond to the first pattern 410a and the second pattern 410b, respectively. The first-pitch-first grooves 136a and the second-pitch-first grooves 136b have shapes that inversely correspond to the first pattern 410a and the second pattern 410b, respectively.

As described above, the light guide member 131 may have grooves formed on multiple sides thereof, e.g., first side 151 and second side 152. Thus, the method of fabricating the exemplary light guide member 131 may include, e.g., forming second grooves 137 on the second side 152 of the light guide member 131. The second grooves 137 may be formed using, e.g., a bite to form the second grooves 137 on the second side 152 of the light guide member and/or using a molding method involving, e.g., a stamper having a pattern formed thereon, which inversely corresponds to a shape of the second grooves 137.

Embodiments of the invention provide a light guide member including plurality of grooves having different characteristics, e.g., pitch and/or depth, on one side thereof, which may enable portions of the light guide member closer to a light source to better scatter, diffuse and guide light such that more uniform and/or completely uniform light may exit from the light guide member and a luminance distribution of the light may be improved. Embodiments of the invention provide a light guide member including a plurality of grooves having a smaller pitch and a plurality of grooves having a larger pitch on a same side thereof, wherein the smaller pitched grooves can help improve reflection and/or dispersion characteristics of light emitted thereon. The plurality of smaller pitch and larger pitch grooves may extend substantially perpendicular to a zero-degree radiation angle of light incident on the light guide member. The relatively smaller pitched grooves may be provided at an end portion of the side of the light guide member including the smaller and larger pitched grooves and/or may be provided at portions of the light guide member outside of a predetermined range of the radiation angle of the light from the light source. Thus, embodiments of the invention may reduce and/or prevent the generation of dark areas and/or bright lines/areas in a luminance distribution of light provided by the light guide member, thereby providing light having a substantially and/or completely uniform luminance distribution and high brightness.

Embodiments of the invention provide a method of forming a light guide member including a plurality of grooves having different characteristics, e.g., pitches, on a same side thereof using, a multi-piece mold core, thereby providing a simplified method for fabricating a light guide member that is capable of providing light having a substantially uniform or completely uniform luminance distribution by controlling a reflection and dispersion properties of light incident thereon. Thus, embodiments of the invention help prevent and/or reduce dark areas and/or bright lines/areas at portions of the light guide member close to the light source(s) and positioned beyond a predetermined radiation angle of light from the light source, thereby providing substantially and/or completely uniform light from the entire area of light guide member. Thus, embodiments of the invention enable light provided from the entire area of the light guide member to be employed by, e.g., a display device.

Although exemplary embodiments of the light guide member and the backlight unit may be described in relation to an exemplary LCD device, embodiments of the invention are not limited to use with an LCD device. Further, although reference is made to a "backlight unit" as an exemplary illumination device, such units are generally called "backlight" units because they may be arranged behind the display panel. However, aspects of the invention are not limited to such arrangements and/or uses.

Exemplary embodiments of the invention have been disclosed herein, and although specific terms are employed, they are used and are to be interpreted in a generic and descriptive sense only and not for purpose of limitation. For example, while V-grooves have been illustrated in embodiments of the invention, characteristics of the first grooves, e.g., pitch, arrangement position, depth, height, etc, in relation to the second grooves may be more important to than the shape of the groove itself. While a V-groove may be the most efficient manner to realize the patterns, the grooves may be curved, and/or have a flat base, rather than have a V-shape. Accordingly, it will be understood by those of ordinary skill in the art that various changes in form and details may be made without departing from the spirit and scope of the invention as set forth in the following claims.

What is claimed is:

1. A method for fabricating a light guide member from a light guide member material, the light guide member guiding light received from a light source, and including a first side including a plurality of first grooves extending along a first direction and a plurality of second grooves extending along the first direction, the method comprising:
   preparing a mold core;
   cutting at least one predetermined region from the mold core forming at least one cut-out portion and a remaining mold core portion;
   forming a first pattern on the remaining mold core portion, the first pattern including at least one of a plurality of projections and grooves extending along a first direction;
   forming a second pattern on the at least one cut-out portion, with a pitch different than that of the first extruded pattern in the divided mold core;
   assembling the mold core by combining the at least one cut-out portion and the remaining mold core portion, the first pattern and the second pattern being arranged on a same side of the assembled mold core; and
   molding the first grooves and the second grooves on a first side of the material for forming the light guide member corresponding to the first and second patterns, respectively, using the assembled mold core.

2. The method as claimed in claim 1, further comprising forming a plurality of third grooves on a second side of the material for forming the light guide member, the third grooves extending perpendicular to the first grooves and the second grooves.

3. The method as claimed in claim 1, wherein forming the first and second patterns comprises forming the first and second patterns using a bite.

4. The method as claimed in claim 1, wherein the at least one cut-out portion corresponds to one or more areas extending from a first end portion of the remaining mold core portion.

5. The method as claimed in claim 4, wherein the remaining mold core portion includes a second end portion that is opposite to the first end portion, the at least one cut-out portion corresponding to at least a portion of the first portion of the first side and being free of the second grooves.

6. The method as claimed in claim 1, wherein the at least one cut-out portion includes a plurality of sub-second-portions spaced apart from each other along a first side of the light guide member.

7. The method as claimed in claim 6, wherein at least some of the first grooves extend between the plurality of sub-second-portions.

8. The method as claimed in claim 6, wherein each of the plurality of sub-second-portions corresponds to one of a triangular shaped portion, a semi-circular shaped portion and a polygonal shape portion on the first side of the light guide member.

9. The method as claimed in claim 1, wherein the second pitch is less than the first pitch.

10. The method as claimed in claim 1, wherein the remaining mold core portion includes a first end portion and a second end portion, the first end portion being opposite to the second end portion along a second direction perpendicular to the first direction, and the second grooves being arranged on at least a portion of the first end portion.

11. The method as claimed in claim 10, wherein at least one of the first pitch and the second pitch changes approaching away from the first end portion toward the second end portion.

12. The method as claimed in claim 10, wherein the first pitch decreases approaching away from the first end portion toward the second end portion.

13. The method as claimed in claim 12, wherein:
the plurality of sub-second portions correspond to a triangular shaped portion, the triangular shaped portion having a base extending a first distance D1 along an edge of the first end portion and a height extending a second distance D2 away from the edge of the first end portion along the second direction, and
the distance D2 is about 95% to about 105% of the first distance D1.

* * * * *